(12) United States Patent
Gilstrap

(10) Patent No.: US 11,448,344 B2
(45) Date of Patent: Sep. 20, 2022

(54) WIDTH-SELECTABLE PIPE FLASHING PIECE AND METHOD OF USE

(71) Applicant: Mark Gilstrap, Monroe, WA (US)

(72) Inventor: Mark Gilstrap, Monroe, WA (US)

( * ) Notice: Subject to any disclaimer, the term of this patent is extended or adjusted under 35 U.S.C. 154(b) by 324 days.

(21) Appl. No.: 16/687,543

(22) Filed: Nov. 18, 2019

(65) Prior Publication Data

US 2021/0148489 A1 May 20, 2021

(51) Int. Cl.
*F16L 5/02* (2006.01)
*E04D 13/147* (2006.01)

(52) U.S. Cl.
CPC ............ *F16L 5/02* (2013.01); *E04D 13/1476* (2013.01)

(58) Field of Classification Search
CPC ................................ E04D 13/1476; F16L 5/02
See application file for complete search history.

(56) References Cited

U.S. PATENT DOCUMENTS

| | | | |
|---|---|---|---|
| 4,280,305 A | 7/1981 | Logsdon | |
| 4,333,660 A * | 6/1982 | Cupit | E04D 13/1476 277/630 |
| 4,864,782 A | 9/1989 | Hasty | |
| 5,222,334 A * | 6/1993 | Hasty | E04D 13/1476 285/4 |
| 5,309,579 A | 5/1994 | Nelson | |
| 5,588,267 A * | 12/1996 | Rodriguez | E04D 13/1476 285/4 |
| 6,543,186 B2 | 4/2003 | Gilleran | |
| 6,860,070 B2 | 3/2005 | Gilleran | |
| 8,209,923 B1 * | 7/2012 | Rich | F23J 13/00 52/219 |
| 8,608,206 B2 * | 12/2013 | Fedale, Sr. | E04D 13/1407 285/43 |
| 9,255,412 B2 * | 2/2016 | Haynes | E04D 13/1407 |
| D796,014 S * | 8/2017 | Haynes | D23/269 |
| 9,863,557 B2 * | 1/2018 | Haynes | H02G 3/22 |
| 10,822,815 B1 * | 11/2020 | Vance | F16L 5/027 |
| 2014/0084549 A1 * | 3/2014 | Haynes | F16L 5/10 277/606 |
| 2015/0323103 A1 | 11/2015 | Coscarella | |
| 2017/0059061 A1 * | 3/2017 | Haynes | E04B 1/6813 |
| 2017/0159296 A1 * | 6/2017 | Vowles | E04D 13/1476 |

(Continued)

FOREIGN PATENT DOCUMENTS

| | | |
|---|---|---|
| DE | 3915007 A1 | 11/1990 |
| FR | 3031790 A1 | 7/2016 |

OTHER PUBLICATIONS

The International Search Report and the Written Opinion of the International Searching Authority (Australia) of PCT/US2020/060878, dated Feb. 16, 2021.

*Primary Examiner* — Eugene G Byrd
(74) *Attorney, Agent, or Firm* — Timothy E. Siegel Patent Law, PLLC; Timothy E. Siegel

(57) ABSTRACT

A flashing piece, having an outer portion, defining an opening and made of a first polymeric material and an inner portion, joined to the outer portion about the opening and extending across and covering the opening. The inner portion is made of a second polymeric material that is more flexible and elastic than the outer material and is in most places of a first thickness and further defines indented rings wherein the second polymeric material is thinner than the first thickness, thereby enabling an installer to begin and propagate a tear about an indented ring.

4 Claims, 7 Drawing Sheets

(56) References Cited

U.S. PATENT DOCUMENTS

2018/0112410 A1\* 4/2018 DeGraan .................. F24F 7/02
2018/0209205 A1 7/2018 Gilleran
2019/0093795 A1 3/2019 Haynes \* cited by examiner

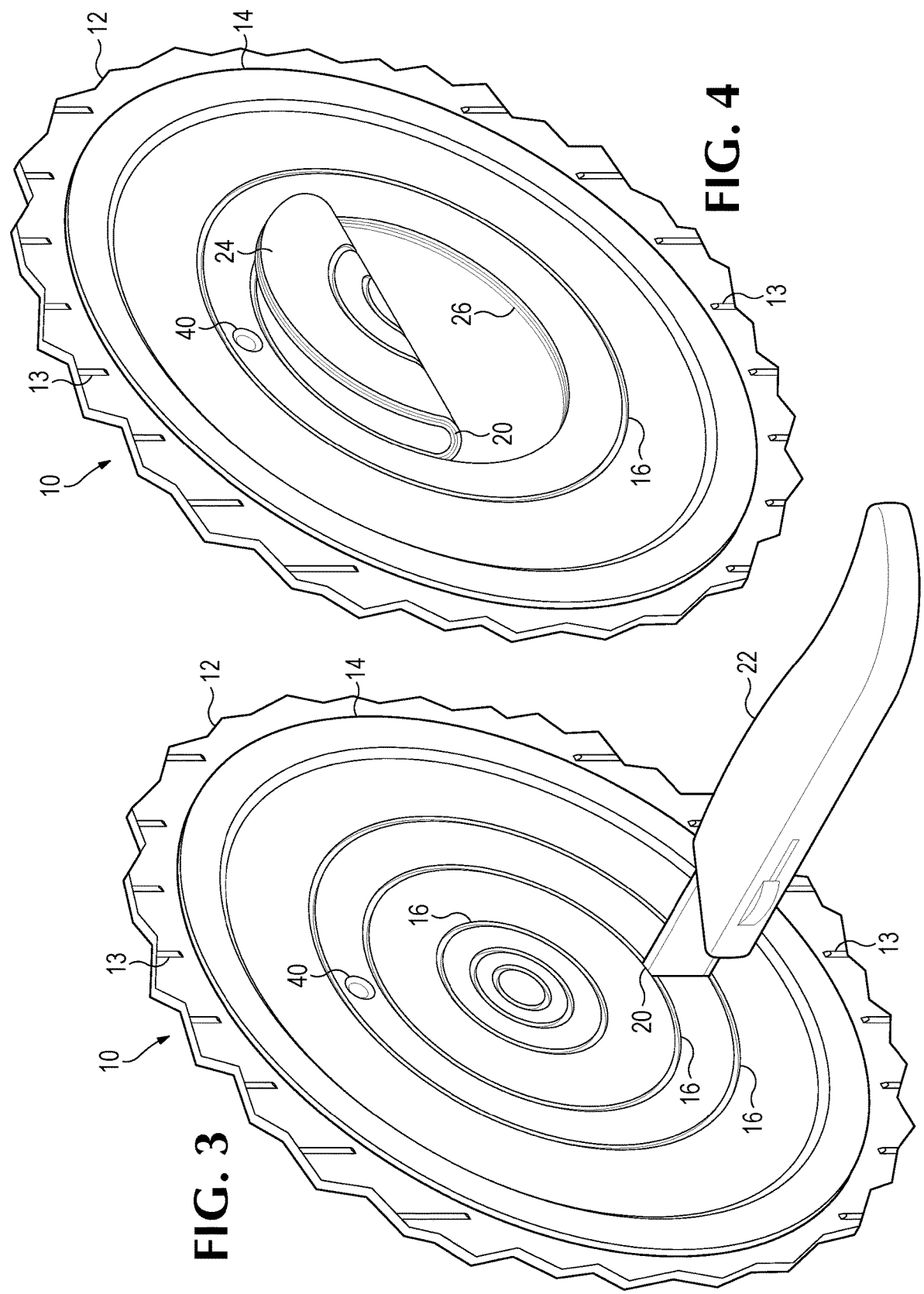

WIDTH-SELECTABLE PIPE FLASHING PIECE AND METHOD OF USE

BACKGROUND OF THE INVENTION

A modern building structure is constructed with an exterior cladding, or primary weather barrier, that provides a first line of defense against the elements and, also provides a good appearance for the building structure. Interior to and generally supporting the exterior cladding there is a building frame, typically made of dimensioned lumber (longitudinal elements) mechanically attached together, with sheets of plywood or particle board mechanically attached to the exterior side of these longitudinal elements. The dimensioned lumber may go by industry standard terminology of 2 by 4s, 2 by 6s, 2 by 8s, or even wider elements, depending on the load that must be born, and other factors. Wall board is typically mechanically fastened to the interior side of the longitudinal elements, thereby defining a "wall cavity" between the exterior sheathing and the interior wall board. A secondary weather barrier, that is generally water resistant and is typically made of polymer sheeting, such as Tyvek®, or building paper, is mechanically attached to the building frame. These sheets are generally arranged as shingles are, with each upper piece of sheeting overlapping on the outside of the sheeting immediately below. With this arrangement water does not have any chance of penetrating through to the wall cavity of the building as it flows downward.

A modern house typically has at least one water pipe leading from outside the house, to inside, to deliver water to the house, and frequently also has a gas pipe leading into the house. Homes have low voltage cables (phone, television, alarms, cameras, internet or ground wires) which also pass through the exterior sheathing causing a breach in the cladding. Also, some forms of air conditioning include pipes carrying cold water from outside to inside the house. Every place where a pipe or cable must pass from outside to inside represents a breach in the cladding of the house, which must be carefully addressed to avoid ingress of water into the wall cavity. To avoid this occurrence, it is typical to employ a flashing piece that defines a hole sized to fit snugly about the pipe. The flashing piece may have a frame of stiffer material, with more flexible material defining the hole, so that the flexible material grips the pipe sufficiently so that water cannot flow through the hole (about the pipe) into the wall cavity.

Any flashing piece that has a pre-defined hole size, however, is limited to pipe of a specific diameter. This complicates materials stocking, because wholesalers and installers must keep on-hand multiple sizes in order to accommodate different pipe sizes. Also, with a flat front surface of the flashing piece, there is a possibility of the exterior cladding abutting and thereby stopping the flow of water down the sheeting of the secondary weather barrier.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a flashing piece, having an outer portion, defining an opening and made of a first polymeric material and an inner portion, joined to the outer portion about the opening and extending across and covering the opening. The inner portion is made of a second polymeric material that is more flexible and elastic than the outer material and is in most places of a first thickness and further defines indented rings wherein the second polymeric material is thinner than the first thickness, thereby enabling an installer to begin and propagate a tear about an indented ring.

In a second separate aspect, the present invention may take the form of a method of installing a pipe during the construction of a structure having walls, including a primary weather barrier, a secondary weather barrier and framing, through a hole in the wall so as to not permit water to enter the structure past the secondary weather barrier, including through the hole in the wall about the pipe. The method is implemented at the point where the framing has been at least partially completed and utilizes a flashing piece having an outer portion, defining an opening and made of a first polymeric material and an inner portion, joined to the outer portion about the opening and extending across and covering the opening. The inner portion is made of a second polymeric material that is more flexible and elastic than the first polymeric material and is in most places of a first thickness and further defines indented rings wherein the second polymeric material is thinner than the first thickness. The method begins with the partial installation of the pipe so that it has a free end extending though the framing. The method continues with broaching one of the indented rings to create a tear along the indented ring, and then propagating the tear about the indented ring, until the tear extends all the way around the indented ring and removing the resultant disk of second polymeric material inside the indented ring, thereby creating a through-hole. The outer portion is attached to the framing and the pipe is extended through the through-hole and is connected to a fixed pipe segment, so that the pipe stays in place and the primary weather barrier is constructed about the pipe.

In a third separate aspect, the present invention may take the form of a pipe installation that has a wall, including an exterior weather barrier, defining a through-hole and an interior weather barrier, including a frame and a layer of fluid impenetrable sheets, over the frame. A flashing piece is joined to the frame, and has an outer portion, defining an opening and made of a first polymeric material, and an inner portion, made of a second polymeric material that is more flexible and elastic than the outer material, joined to the outer portion about the opening and extending across and partially covering the opening. Further, the inner portion defines a through-hole and a pipe, extends through the through-hole. Finally, there are a set of raised features, on the outer portion, collectively forming down-channels for water that has contacted the interior barrier and preventing an inner surface of the exterior barrier from blocking downward flow of the water by abutting the first outer portion.

In a fourth separate aspect, the present invention may take the form of a flashing piece, having an outer portion, defining an opening and made of a first polymeric material and an inner portion, joined to the outer portion about the opening and extending across and covering the opening. The inner portion is made of a second polymeric material that is more flexible and elastic than the outer material and is in most places of a first thickness and further defines a set of thinned spots of a second thickness, thinner than said first thickness, thereby permitting a cable to be passed through in way that prevents water ingress due to the flexibility and elasticity of the second polymeric material.

BRIEF DESCRIPTION OF DRAWINGS

Various embodiments of the invention are disclosed in the following detailed description and accompanying drawings.

FIG. 3 is an isometric view of the flashing of FIG. 1, being broached by a utility knife.

FIG. 4 is an isometric view of the flashing of FIG. 1, with a section being removed.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some, or all, of these specific details. For the purpose of clarity, technical material that is known in the technical fields related to the invention has not been described in detail so that the invention is not unnecessarily obscured.

Figure 1:
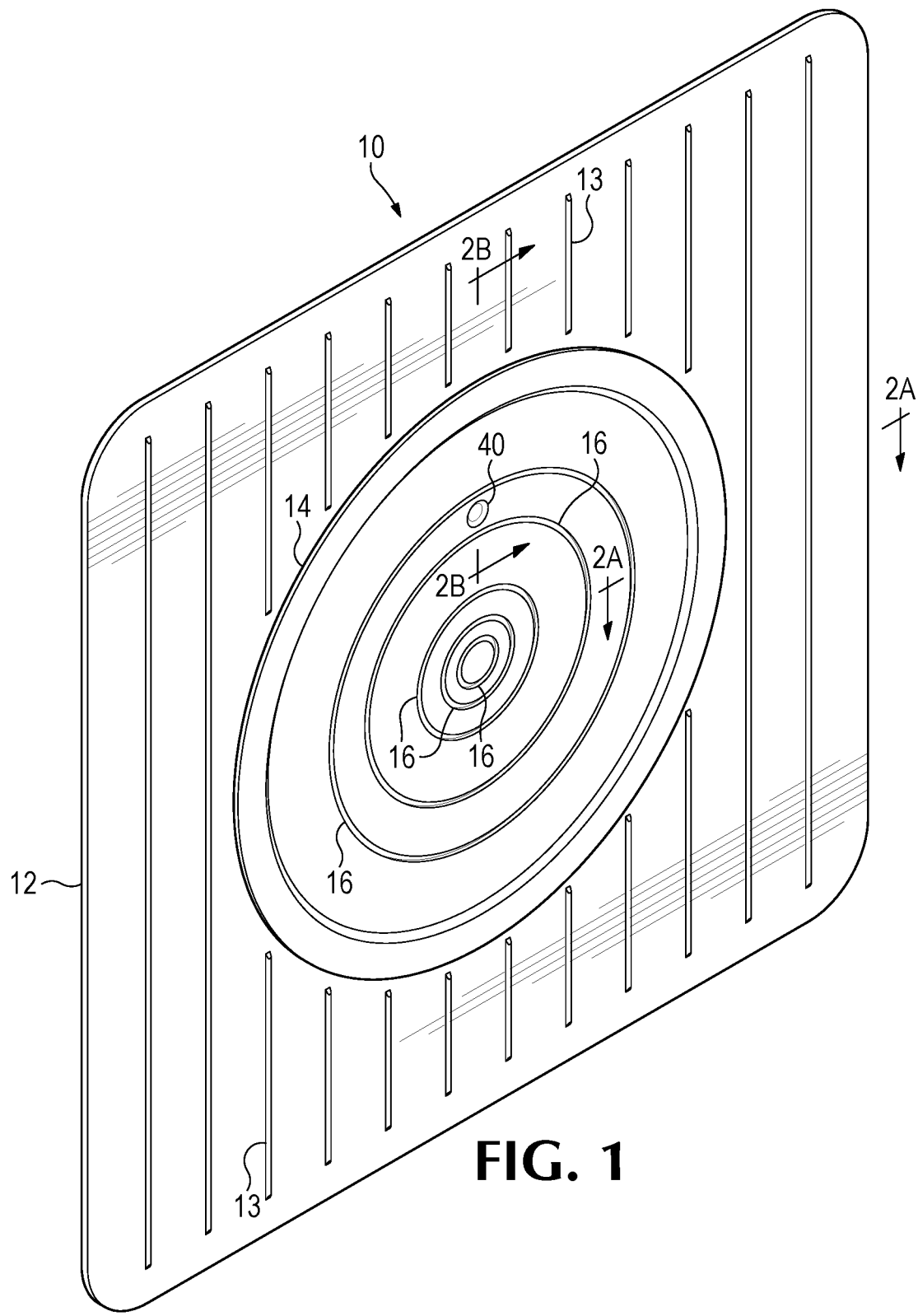
FIG. 1 is an isometric view of a piece of flashing, according to the present invention.
Figure 2A:
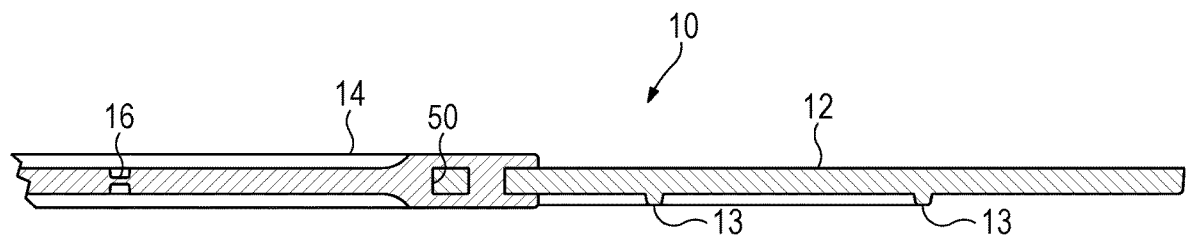
FIG. 2A is a sectional view of the piece of flashing of FIG. 1, taken along line 2A-2A of FIG. 1.
Figure 2B:
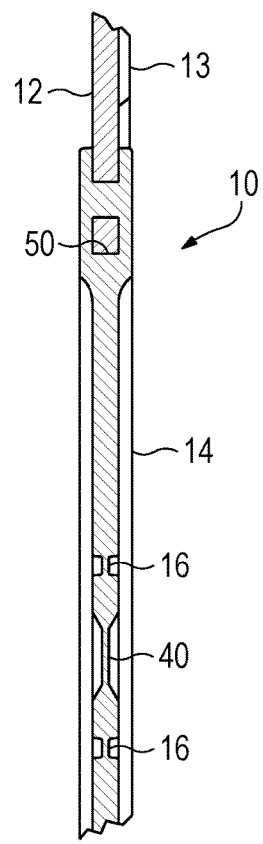
FIG. 2B is a sectional view of the piece of flashing of FIG. 1, taken along line 2B-2B of FIG. 1.
Figure 5:
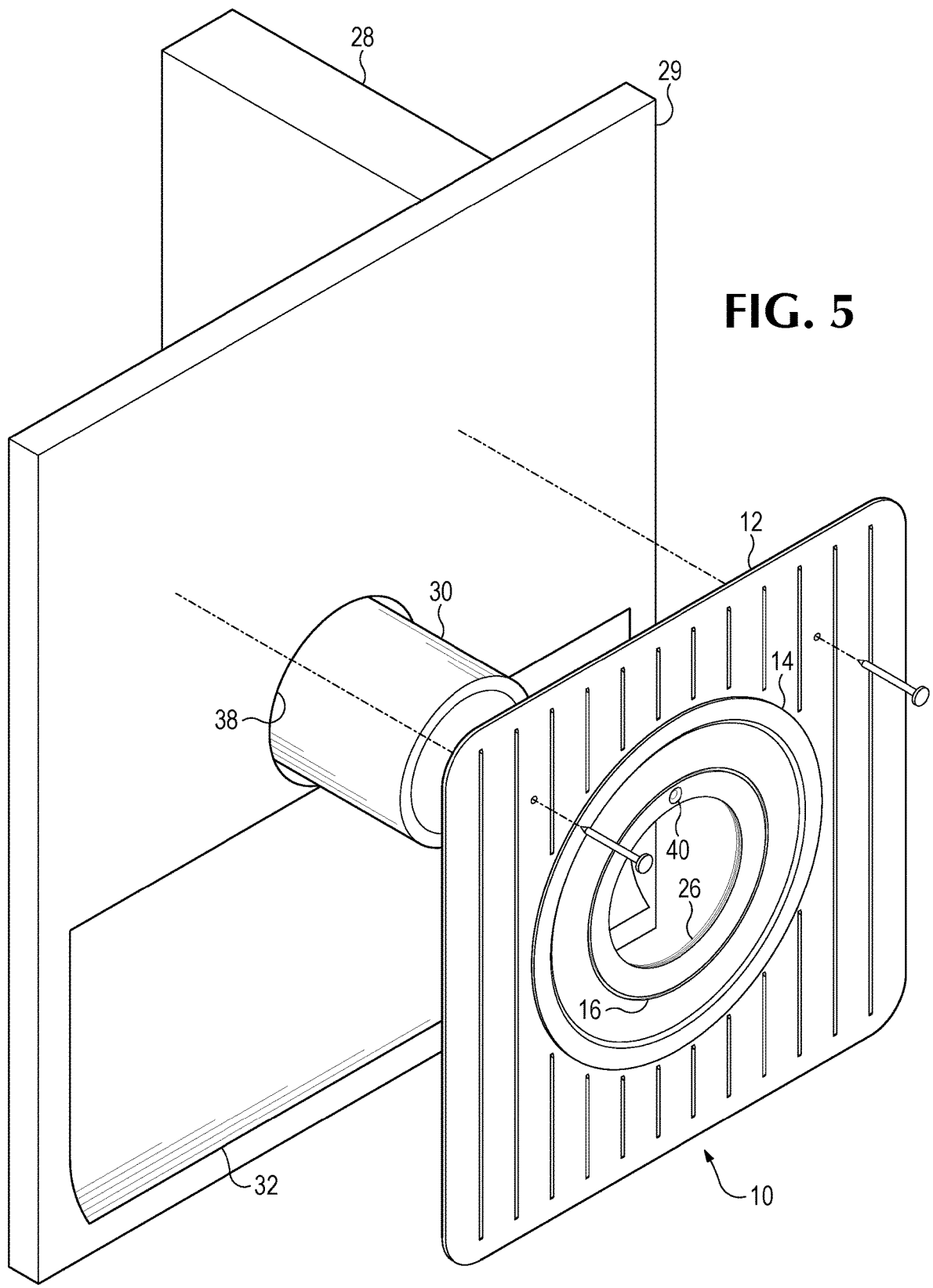
FIG. 5 is an isometric view of the flashing of FIG. 1, being installed onto a partially constructed wall, about a pipe.
Figure 6:
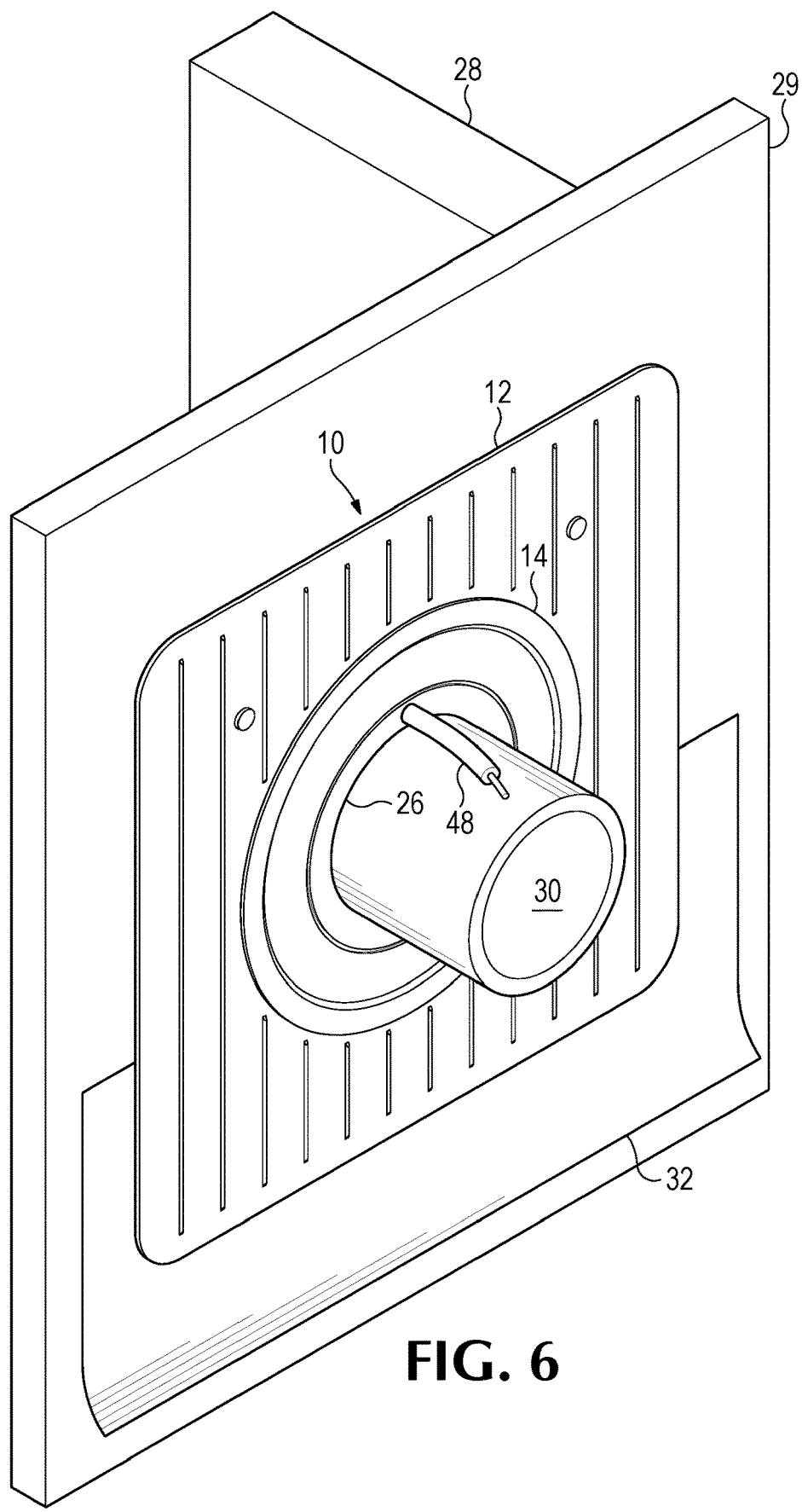
FIG. 6 is an isometric view of the flashing of FIG. 1, installed onto the partially constructed wall, and about the pipe of FIG. 5, and also having a ground wire, penetrating the piece of flashing.
Figure 7:
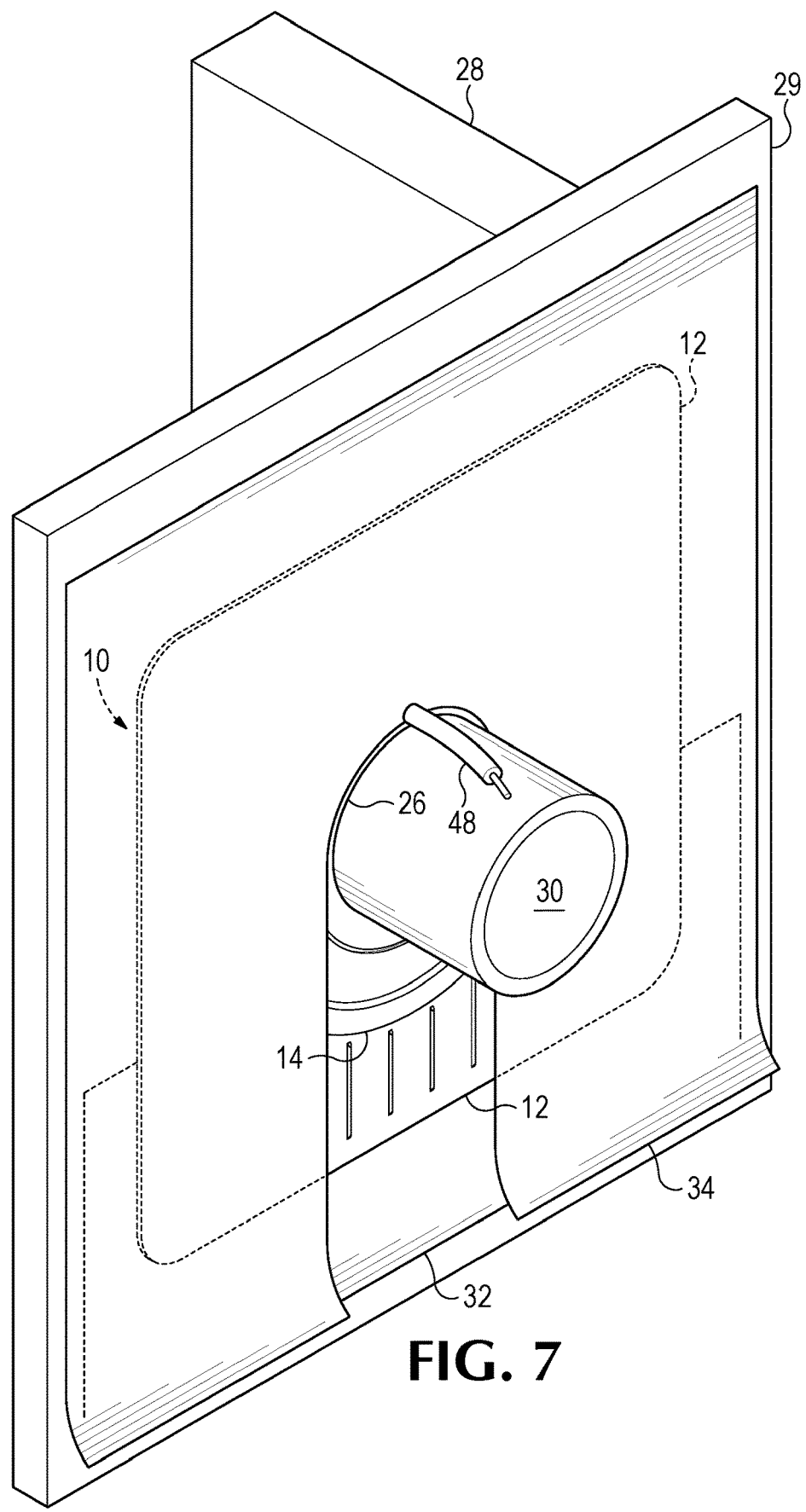
FIG. 7 is an isometric view of the partially constructed wall of FIG. 5, incorporating the flashing piece of FIG. 1, at a further stage of construction.

Referring to FIGS. 1 and 2, an embodiment of a flashing piece 10 includes a rigid panel 12, that defines a set of raised ribs 13, which form water channels therebetween. In some cases, the outer weather barrier of a wall may contact the front face of panel 12, and if not for ribs 13 could block the downward flow of water. Further, panel 12 supports a circular portion 14 that is made of an elastic material. A set of indented rings 16 are defined in portion 14. As shown in FIGS. 3 and 4, each of these permit an installer to start a tear 20, using a knife 22. Tear 20 may then be easily propagated by pulling on the detached flap 24, until the tear 20 propagates along the entire circle, detaching the flap 24 (now a circular piece). Flashing piece 10 now defines a through-hole 26 sized according to the need of the installer. Referring to FIG. 5, the installer is now set to secure panel 12 onto a structural support, in the form of a framing timber 28, such as a 2×4, or a sheathing element 29 and, as shown in FIG. 6, to extend a pipe 30 through the through-hole 26. At this stage the bottom portion of panel 12 extends over a liquid impermeable sheet 32, such as a polymeric sheet. Referring to FIG. 7, an additional liquid impermeable sheet 34 may then be installed to drape over most of flashing piece 10 (except where prevented by pipe 30), to create a full secondary weather barrier.

It may be noted that there are at least two different forms of construction, open-frame construction, where sheathing 29 would not be present, and sheathed wall construction, having sheathing 29. Sheathing 29 forms a part of the frame, and if it is present, panel 12 would typically be secured onto the sheathing 29, which would also have a sheathing through-hole 38 (FIG. 5) created to accommodate the pipe 30. As shown in FIGS. 5, 6 and 7, pipe 30 is supported by a fixed pipe section (not shown). After the stage shown in FIG. 7, an exterior weather barrier is constructed of any one of a number of different materials, such as brick, shingle siding, wood, etc. A hole is left for pipe 30 to extend through. In some cases, pipe 30 is connected to an exterior fixed pipe and is fit through through-hole 26 from the outside.

In the case of gas pipes, it is common to have a grounding wire installed in association with the pipe. To accommodate such a wire, a thinned, easily broached spot 40 of portion 14 is provided. Spot 40 also permits a workman to push a low voltage cable through the elastic material (such as for a phone, television, alarms, cameras, internet or ground wires) without first cutting a through-hole in flashing piece 10. The elastic material of portion 14 seals around a cable or cables, thereby providing superior protection against water ingress at the point of entry for a cable or cables. Often spot 40 will be used as an entry point for a cable that is not associated with any pipe entering through portion 14. It is notable that the sides of thinned spots 40 taper inwardly from the full thickness section of portion 14 to the fully thinned center area of spot 40. This permits the accommodation of wires and cables having varying thicknesses, with a thick cable being hugged by the thicker, tapering portions near the perimeter of thinned spot 40, and a thinner wire piercing only in the thinned area, and being hugged by the material around that wire. Typically, the grounding wire shown in FIG. 6, will be present at the point in the construction process shown in FIG. 5. In an alternative preferred embodiment, additional spots 40 are provided to provide access points for additional cables.

Rigid panel 12 may be made of polyvinyl chloride or polyamide, or any other material that is rigid enough to stay in place after being secured into a structural support. Circular portion 14 may be made of silicone rubber or similar rubbery, gripping material, having some elasticity to accept and grip a pipe. Both rigid panel 12 and circular portion 14 are, in most places 70 mils (1.8 mm) thick. In embodiments, the thickness of rigid panel 12 and circular portion 14 range between 1 mm and 3 mm thick. Each indented ring 16 is 20 mils (0.5 mm) thick. In embodiments indented rings 16 range from 0.2 mm thick to 1 mm thick. In embodiments indented rings 16 are one-eighth to one-half the thickness of the remainder of portion 14. The joint between circular portion and rigid panel is formed by the elastomeric material interlocking with the more rigid material, as shown in FIG. 2. Panel 12 is formed first and then placed in a mold into which the more elastic material that will form portion 14 is injected, in molten form, intruding into and filling through-holes 50 (FIG. 2) in panel 12, to interlock with it.

Figure 8:
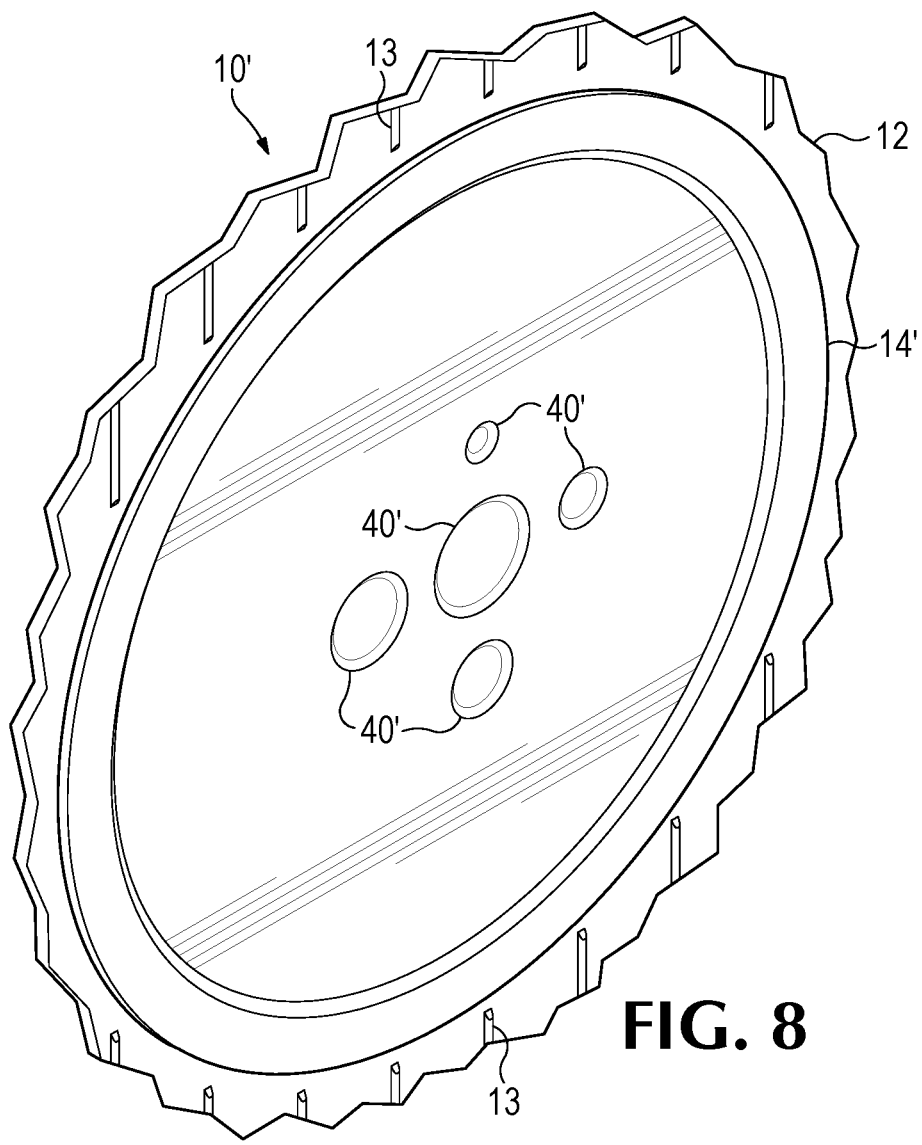
FIG. 8 is an expanded view of the center portion of an alternative embodiment of a flashing piece, adapted to facilitate running cable into a structure.

Referring now to FIG. 8, in an alternative embodiment of a flashing piece 10' center portion 14' does not include concentric rings, but instead has a set of thinned spots 40' for passing a number of cables into a structure while avoiding providing a path for water ingress. In the embodiment shown the thinned spots 40' are different sizes, to accommodate different size cables. In an alternative preferred embodiment spots 40' are all the same size, to accommodate a set of cables that are all the same size. Flashing piece 10' can also accommodate the situation where the installer does not have prior knowledge of the thickness of the cable to be installed at the time in which piece 10' is purchased and taken to a field location. The different size spots 40' can accommodate any one of a number of different cable sizes. Notably, each spot 40' includes the tapering perimeter shown in cross-section in FIG. 2B and discussed in association therewith. In an alternative preferred embodiment, all of the thinned spots 40' are of the same width and are arranged in an even grid, about the center of portion 14'.

The disclosed embodiments are illustrative, not restrictive. While specific configurations of pipe flashing have been described, it is understood that the present invention can be applied to a wide variety of flashing and water blockage. There are many alternative ways of implementing the invention.

What is claimed is:

1. A method of installing a pipe during the construction of a structure having walls, including a primary weather barrier, a secondary weather barrier and framing, at the point where the framing has been at least partially completed, through a hole in a said wall, so as to not permit water to enter said structure past said secondary weather barrier, including through said hole in said wall about said pipe, comprising:
   a) providing a flashing piece, comprising:
      i. an outer portion, defining an opening and made of a first polymeric material; and
      ii. an inner portion, joined to said outer portion about said opening and extending across and covering said opening; and
      iii. wherein said inner portion is made of a second polymeric material that is more flexible and elastic than said first polymeric material and is in most places of a first thickness and further defines indented rings wherein said second polymeric material is thinner than said first thickness;
   b) partially installing said pipe, so that it has a free end extending through said framing;
   c) broaching one of said indented rings to create a tear along said indented ring, and then propagating said tear about said indented ring, until said tear extends all the way around said indented ring and removing the resultant disk of second polymeric material inside said indented ring, thereby creating a through-hole;
   d) placing said through-hole about said pipe and attaching said outer portion to said framing; and
   e) constructing the primary weather barrier, about said pipe; and
   f) wherein said inner portion further includes a thin spot, and wherein said method includes broaching said thin spot and passing a grounding wire through it.

2. The method of claim 1, wherein said outer portion includes raised features that collectively form down channels for unobstructed water flow.

3. The method of claim 2, wherein said raised features are vertically oriented raised ribs.

4. The method of claim 1, wherein said framing includes sheathing, and wherein a hole is formed in said sheathing to accommodate said pipe.

* * * * *